United States Patent [19]
Cotéet al.

[11] Patent Number: 5,585,697
[45] Date of Patent: Dec. 17, 1996

[54] PAR LAMP HAVING AN INTEGRAL PHOTOELECTRIC CIRCUIT ARRANGEMENT

[75] Inventors: Paul T. Coté, Cleveland Heights; Lance G. Kaczorowski, Eastlake; Joseph W. Magalotti, Euclid; Joseph F. Schiciano, Mayfield Village; Douglas M. Rutan, Cleveland Heights, all of Ohio

[73] Assignee: General Electric Company, Schenectady, N.Y.

[21] Appl. No.: 340,774

[22] Filed: Nov. 17, 1994

[51] Int. Cl.$^6$ .............................. H05B 37/02; F21V 8/00
[52] U.S. Cl. .................. 315/157; 315/150; 315/159; 313/113; 362/802; 362/276; 250/239; 250/227.11; 250/214 AL; 250/205
[58] Field of Search .................. 315/149, 150, 315/151, 158, 159, 157; 250/239, 227.11, 214 AL, 205; 313/113, 573, 634; 362/802, 276

[56] References Cited

U.S. PATENT DOCUMENTS

| | | | |
|---|---|---|---|
| 3,056,035 | 9/1962 | Berhnheim | 250/239 |
| 3,273,012 | 9/1966 | Rosenblum | 315/82 |
| 3,401,265 | 9/1968 | Dotto | 250/206 |
| 3,433,967 | 3/1969 | Bernheim | 250/239 |
| 3,496,422 | 2/1970 | Horowitz | 317/124 |
| 3,621,269 | 11/1971 | Misencik | 250/277 |
| 4,015,120 | 3/1977 | Cole | 250/216 |
| 4,023,035 | 5/1977 | Rodriguez | 250/239 |
| 4,514,630 | 4/1985 | Takahashi | 250/342 |
| 4,823,051 | 4/1989 | Young | 315/155 |
| 4,907,139 | 3/1990 | Quiogue | 250/239 X |
| 4,959,583 | 9/1990 | Arsena et al. | 313/113 |
| 4,988,921 | 1/1991 | Ratner et al. | 315/159 |
| 5,089,704 | 2/1992 | Perkins | 250/342 |

FOREIGN PATENT DOCUMENTS

| | | |
|---|---|---|
| 1085830 | 10/1967 | United Kingdom . |
| 1325810 | 8/1973 | United Kingdom . |

Primary Examiner—Robert Pascal
Assistant Examiner—Arnold Kinkead
Attorney, Agent, or Firm—George E. Hawranko

[57] ABSTRACT

A reflector lamp assembly having an integral photo-sensor and sensing circuit arrangement associated therewith provides for sensing the ambient light conditions at a point adjacent the top surface of the lamp envelope. The photo-sensor element is disposed within a sensor housing member mounted along an edge portion of the top surface of the lamp. A channel pathway is integrally formed with the sensor housing member and extends along the side lamp envelope to protect the sensor lead wires extending from the photo-sensor device to the sensing circuitry contained in the threaded screw base. The sensing circuitry is disposed vertically within a cavity formed in the bottom of the screw base so as to achieve optimum thermal dissipation properties for the sensing circuit. A collimator tube can be inserted into an opening formed at the top of the sensor housing member so as to control the field of view for sensing the ambient light conditions occurring near the top surface of the lamp assembly.

15 Claims, 4 Drawing Sheets

5,585,697

PAR LAMP HAVING AN INTEGRAL PHOTOELECTRIC CIRCUIT ARRANGEMENT

FIELD OF THE INVENTION

This invention relates to a parabolic aluminized reflector (PAR) lamp having associated therewith, an integral photoelectric sensor and circuit arrangement. More particularly, this invention relates to such a PAR lamp as provides for the placement of the photosensitive device in a position that allows for the optimum sensitivity to ambient light conditions.

BACKGROUND OF THE INVENTION

PAR and the related reflector lamps have found widespread usage in a variety of outdoor residential and commercial applications particularly for lighting residential driveways and yards, entrance ways to buildings, and other similar areas where the wide spread of light output of PAR and reflector lamps provides the necessary safety as well as the convenience features desired for these types of applications. To insure that the safety and convenience features of PAR lamps are enjoyed at all times rather than just when the homeowner or business owner remembers to turn on the lamp, it has become common practice to provide a photosensor arrangement for automatically turning the lamp on when ambient light conditions fall below a certain level. Typical photosensor arrangements for use with PAR lamps come in the form of a separate adaptor base that screws into the socket of a conventional outdoor light fixture with the PAR lamp then being installed into an equivalent socket on the adaptor. Examples of such adaptor type photosensor devices can be found in U.S. Pat. Nos. 3,056,035; 3,496,422; 3,621,269; and 4,023,035. The problem with this approach to providing a photosensitive actuation of a lighting product particularly a PAR type of lamp is that the adaptor takes up a significant amount of space between the fixture socket and then what becomes the extended outward edge of the lighting product. Because of such size constraints, the use of an adaptor approach is often limited in terms of the number and variety of lighting fixtures in which it can be used. Additionally, for a PAR lamp wherein the light output is directed through the top surface of the lamp and not through the sides as a typical incandescent lamp, it is also a problem in that the fixture typically is made of metal or some other opaque material. As such, with the photosensor of an adaptor configuration disposed substantially below the point at which the ambient light can be accurately sensed, inaccurate readings can be experienced with the sensor detecting the lack of light within the light fixture as an indication that it must now turn on. Accordingly, it would be advantageous if a photosensor arrangement could be provided that would be particularly useful in conjunction with a PAR lamp and the type of fixture in which such a PAR lamp is utilized.

One approach to solving this problem has been to incorporate the photosensor as well as the circuitry associated therewith that monitors the output of the photosensor and turns the lamp on, into the base of the lamp itself and to avoid the use of an adaptor altogether. An example of such a configuration can be found in U.S. Pat. No. 4,988,921. Although such a configuration moves the photosensor up to a point just below the bottom portion of the lamp envelope, it should be noted that such photosensor is still substantially down the length of the lamp such that placement of the combination photosensor/lamp configuration in a fixture designed for use of a PAR lamp results in substantial blockage of the photosensor by the fixture housing. Additionally, the lamp of the '921 reference is in the form of an A-line lamp, not a reflector configuration. As such, though the photosensor is near to the area where light is emitted, the A-line lamp configuration still does not lend itself to use in the types of fixtures typically used for illuminating larger areas around homes and commercial establishments, particularly those applications where a PAR lamp is best suited. Accordingly, it would be advantageous to provide a photosensor and circuit arrangement integral with a PAR lamp which could best be utilized in fixtures generally configured for applications involving illumination of larger areas with the wider beam spread pattern of a PAR lamp.

SUMMARY OF THE INVENTION

The present invention provides for a PAR lamp having associated therewith, an integral photosensor and circuit arrangement for providing an automatic turn-on feature of such PAR lamp when ambient light conditions reach a certain minimum level. The present invention provides such an integral PAR lamp and photosensor arrangement wherein the photosensor device is disposed on the lamp in a manner where, regardless of the type of light fixture in which the lamp and sensor arrangement are disposed, the same accurate performance will occur.

In accordance with the principles of the present invention, there is provided a lamp assembly having a lamp envelope with a top portion through which light output is directed and a side portion which has a reflective coating disposed on the internal surface thereof. A light source such as a tungsten halogen incandescent light source is disposed within the lamp envelope. A threaded screw base is mounted on a bottom tapered neck portion of the lamp envelope, the screw base allowing for the coupling of appropriate energy to the light source. A photo-sensor is mounted on the top portion of the lamp envelope, the photo-sensor being effective for sensing ambient light conditions at a position near the front surface of the lamp assembly. The output of the photo-sensor is coupled through a lead path formed along the side portion of the lamp envelope, to a sensor circuit. The sensor circuit is mounted in the screw base and is effective for controlling the on and off condition of the lamp assembly as a function of the status of the photo-sensor.

BRIEF DESCRIPTION OF THE DRAWINGS

In the following detailed description, reference will be made to the attached drawings in which.

DETAILED DESCRIPTION OF THE INVENTION

Figures 1, 2:
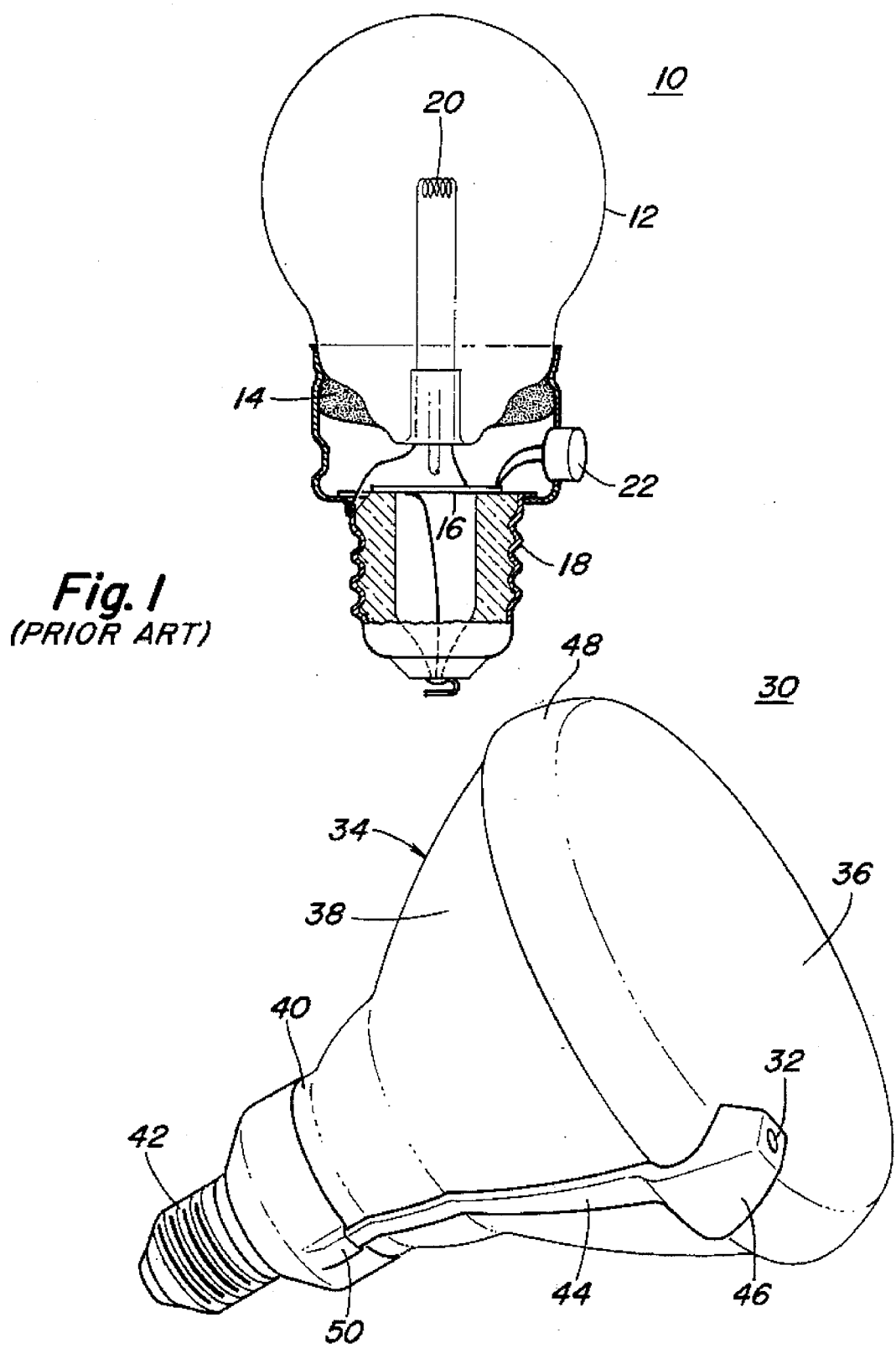
FIG. 1 is an elevational view in section of a combination lamp and photo-sensor circuit constructed in accordance with the teachings of the prior art.
FIG. 2 is an perspective view of a PAR lamp having in integral photo-sensor and circuit arrangement constructed in accordance with the present invention.

As seen in FIG. 1, a lamp assembly 10 having an integral photosensor arrangement is provided with a lamp envelope 12 which is in the general configuration of a standard A-line lamp. Distinct from a conventional A-line lamp however, the lamp assembly 10 has a base housing portion 14 in which the sensor circuitry 16 is mounted. Power to the lamp assembly 10 is provided through a conventional screw base 18 and is controlled by way of the sensor circuitry 16. The light source 20 shown in FIG. 1 is a conventional incandescent filament light source. It should be understood that the lamp assembly 10 of FIG. 1 is one that can only be utilized outdoors in a fixture that is open; that is, one where the fixture does not have light blocking side panels but instead is made with light transmissive side panels thereby allowing light output from the lamp to be transmitted as well as light conditions surrounding the lamp to be received therethrough. Because of the rounded shape of the lamp envelope 12 of FIG. 1, it is only possible to mount a photo-sensor device 22 on a side of the base housing portion 14 which has the effect of limiting the application of such lamp assembly 10 to open sided fixtures. It should further be noted that the lamp assembly 10 of FIG. 1 provides for the mounting of the sensor circuitry 16 at a point between the base housing 14 and the screw base 18 and that such mounting is in a horizontal position when viewed from the perspective of FIG. 1. The thermal management requirements of such a circuit mounting arrangement is such that sufficient cooling space must be left surrounding the circuitry so as to allow for appropriate temperature conditions to insure long life capabilities of the lamp assembly 10.

As seen in FIG. 2, a lamp assembly 30 constructed in accordance with the present invention and having an integral photo-sensor member 32 associated therewith, is configured in the form of a reflector type of lamp. With the reflector configuration as shown in FIG. 2, the lamp envelope 34 has an essentially planar top surface 36 which is made of a light transmissive glass material and through which light output from a light source to be described hereinafter, is transmitted. Extending downward from the top surface 36 of the lamp envelope 34 is a tapered side portion 38 which has a reflective coating disposed on the internal surface thereof, such reflective coating being an aluminized coating and being deposited on the glass surface using well known techniques. Formed at the bottommost portion of the lamp envelope 34 is a neck portion 40 on which is mounted a screw base member 42 effective for allowing connection of energy to the light source through a conventional lamp socket (not shown).

Formed intermediate the top surface 36 and the tapered side portion 38 of the lamp envelope 34, is a side edge surface 48 on which is mounted a sensor housing member 46. The photo-sensor member 32 is disposed within the sensor housing member 46 so as to be aimed in a direction that allows for optimum sensing of the ambient light conditions present at the top surface 36 of the lamp envelope 34. The sensor housing member 46 is made of a molded plastic material and has an inner surface which is formed to contour to the shape of the side edge portion 48 of the lamp envelope 34. In this manner, the sensor housing member 46 can be securely mounted to the lamp envelope 34 by use of an appropriate adhesive material such as for instance, RTV 6808 sold by the Silicone Products Division of GE. Extending downward from the sensor housing member 46 is a channel pathway 44 which is also made of a molded plastic material and is contoured to the shape of the profile of the side portions of the lamp envelope so to be easily secured thereto using an appropriate adhesive material.

Lead wires (not shown) from the photo-sensor device 32 extend within the channel pathway and are protected thereby, such lead wires extending to the sensing circuitry as will be described in further detail with respect to FIG. 5. It will be noted that the sensor housing member 46 and the channel pathway 44 are formed in an integral manner. It should be understood that these 2 elements can be separately formed and can be formed of different materials and yet still achieve the same benefit of allowing the photo-sensor to be disposed on the top surface 36 of the lamp envelope 34 so as to sense ambient light conditions at this top surface region. It is expected that such variations of material and manufacture of the sensor housing 46 and channel pathway 44 would be within the scope of the present invention. For instance, the side channel pathway 44 and mounting of the photo-sensor 32 to the top surface 36 could be provided by means of a bead of a silicone material and still function in accordance with the teachings of the present invention. The bottom end of the channel pathway 44 fits within a channel slot 50 formed at the upper edge of the screw base member 42.

Figure 3:
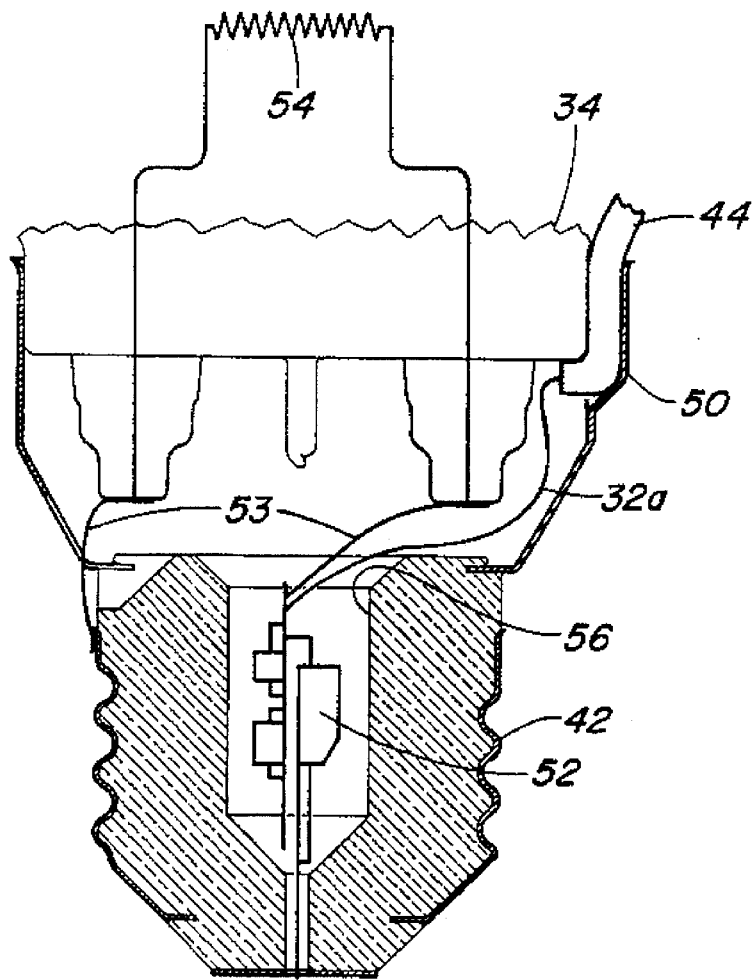
FIG. 3 is an elevational view in section of the sensor circuit arrangement disposed in the screw base in accordance with the present invention.
Figure 5:
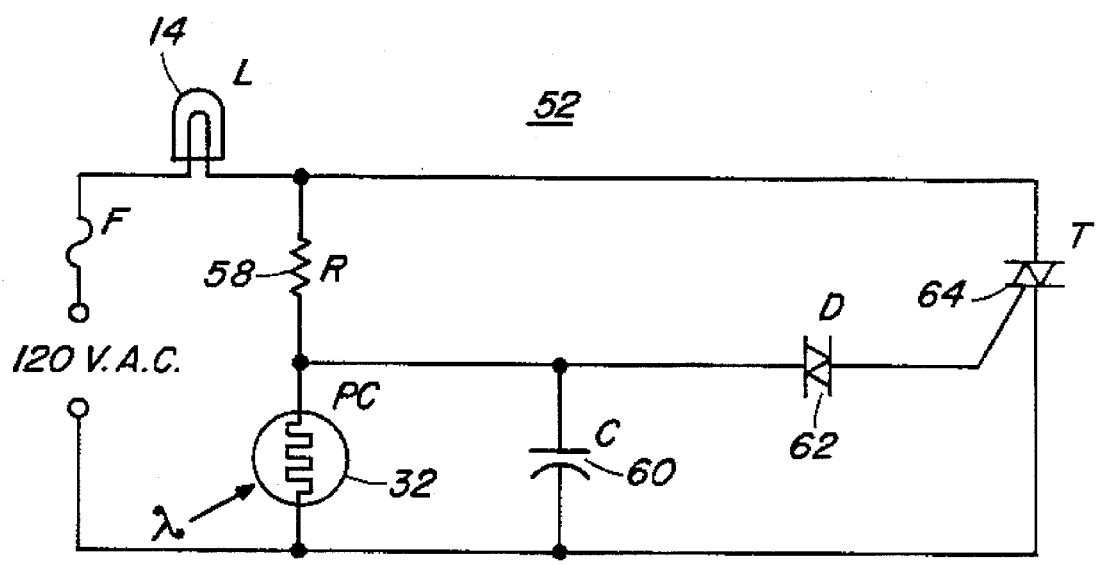
FIG. 5 is a circuit diagram of a photosensor detection circuit constructed in accordance with the present invention.

The lead wires from the photo-sensor 32 extend into the screw base member 42 as shown in FIG. 3 so as to be connected to the sensor circuit 52 shown in representational form in FIG. 3 and described in further detail in FIG. 5. As seen in FIG. 3, the sensor circuit 52 is disposed vertically within a cavity 56 formed within the screw base member 42. Extending from the sensor circuitry 52 is one of a pair of lamp lead wires 53, the other of the lamp lead wires 53 being connected from the light source 54 to the outer shell of the screw base 42. As seen in this figure, the light source 54 is a conventional filament light source. However, it is to be understood that the present invention will operate equally as well with other types of light sources such as for example a tungsten halogen incandescent light source such as described in U.S. Pat. No. 4,959,583 issued to Arsena et al on Sep. 25, 1990, assigned to the same assignee as the present invention and which is herein incorporated by reference.

With respect to the vertical orientation of the sensor circuitry 52 within the cavity 56 formed within the screw base 52, it should be understood that the thermal management benefits to such an arrangement are significantly better than could be achieved with a horizontal orientation of circuitry above the screw base as is shown by reference number 16 in the prior art lamp assembly of FIG. 1. Specifically, by the vertical orientation of the sensor circuitry 52, thermal convection currents can flow across both sides of the circuit arrangement 52 as well as above the circuit arrangement into the space between the screw base 42 and the bottom portion of the lamp envelope 34. Moreover, since it is known that the screw base member of any lamp is the location which has the best thermal dissipation properties by virtue of being disposed within a lamp socket, by disposing the circuit arrangement totally within the screw base 42, the sensor circuit arrangement 52 enjoys the benefit of having a greater thermal dissipation property than any other circuit arrangement disposed above the screw base member 42. Additionally, a thermally conductive silicone potting compound can be added so as to encapsulate circuit arrangement 52. In this manner, hot spots are prevented and heat transfer to the socket is enhanced.

Figure 4:
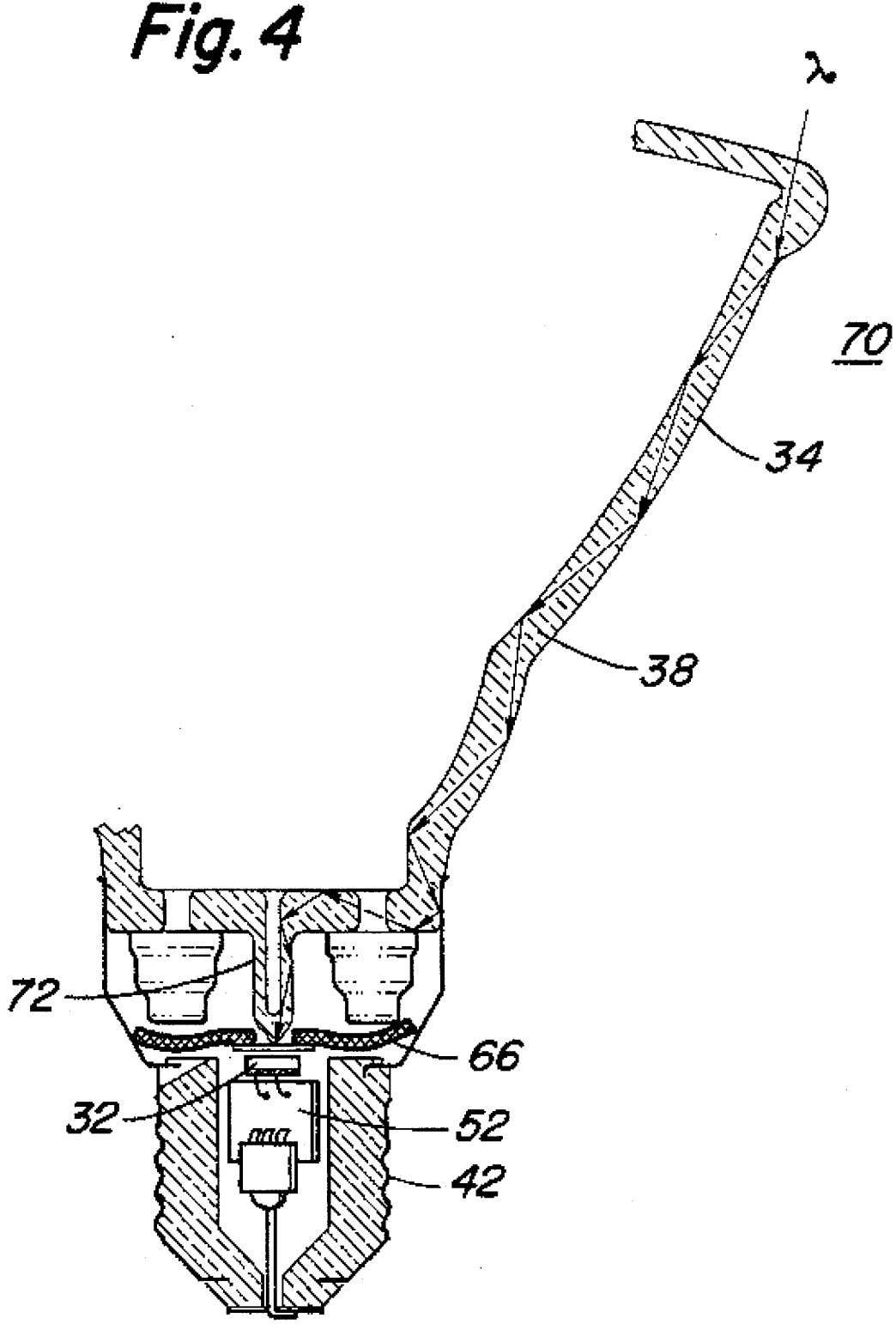
FIG. 4 is an elevational view in section of an alternate arrangement for sensing light conditions for use in an integral photosensor and lamp arrangement constructed in accordance with an alternate embodiment of the invention.

As seen in FIG. 4, an alternate embodiment of a lamp assembly 70 having an integral photo-sensor and photo-sensor circuit associated therewith wherein the ambient light conditions at the top surface of the lamp are sensed to determine the on and off conditions of the lamp, is provided. In the configuration of FIG. 4, rather than disposing the photosensor 32 on the top surface 36 of the lamp envelope 34, the photosensor 32 is disposed within the screw base member 42 and the ambient light conditions occurring at the top surface of the lamp assembly 70 are piped or transmitted down to the photo-sensor 32 through the side wall portion 38 of the lamp envelope 34. The ambient light conditions represented by the reference lambda in FIG. 4 are gathered from around the entire periphery of the side portion 38 and are transmitted downward toward the center of the neck portion of the lamp envelope 34 where such ambient light conditions are finally conveyed to the photo-sensor through the tip-off region 72 disposed directly above the photo-sensor member 32. A flexible support disc 66 can be mounted onto the edge of the photosensor device 32 so as to allow easy positioning of the photo-sensor 32 within the space formed between the bottom portion of the lamp envelope 34 and the top portion of the screw base 42. In the preferred embodiment, the flexible support member 66 would also act as an insulating layer insuring that heat from the light source 54 is not directed to the circuit arrangement 52. By such an arrangement, the need for a channel pathway having leads disposed therein is totally avoided and the photo-sensor 32 can be actually mounted onto the circuit board portion of the sensor circuit arrangement 52.

The sensor circuit arrangement shown representationally in FIGS. 3 and 4 is shown in detail in FIG. 5. In this circuit arrangement 52, current to the light source 54 is controlled by means of a conventional triac phase control arrangement. The circuit arrangement includes a resistor member 58 coupled on one end to one of the lamp leads, and to the photo-sensor member 32 on the other end; a capacitor 60 coupled across the photosensor member 32; a diac device 62 connected on one end to a common node between the resistor 58, capacitor 60 and the photo-sensor device 32 and on the other end to the firing gate for a triac device 64. The triac device is connected on one end to a lamp lead and on the other end to one terminal of the voltage source. In operation, the sensor circuit arrangement of FIG. 5 is effective when the photo-sensor member 32 detects a dark condition indicating a footcandle level of below a certain threshold, for turning on the diac device 62 which in turn fires the triac device 64 thus allowing current to flow through the light source 54. In the circuit arrangement 52 of FIG. 5, the photo-sensor member 32 is provided by use of a commercially available product from EG&G/Vactec Company having a component number of VT93F153G; the diac and triac devices 62, 64 are commercially available from SGS-Thomson Inc. as their product numbers DB3TG and T410-400D respectively. For the resistor 58 and capacitor 60 elements, respective exemplary values are 130 kohms (1%, ¼W, Metal Film) and, 0.022 microfarads (10%, 100V, Ceramic). Of course, it should be understood that other components can be utilized for circuit arrangement 52, for instance instead of a resistive photo-sensor, a photo-diode, photo-transistor or photo-SCR could be used using other appropriate circuit configuration.

Additionally, it should be understood that the triac phase control circuit embodied in FIG. 5 is but one example of achieving the benefits of the present invention. Other circuit configurations could be substituted and perform equally as well; for instance, a power MOSFET switching arrangement could be provided if a diode bridge could also be included to provide the necessary DC voltage for operation of the MOSFET design. In addition, instead of a triac device, a miniature bi-metal switch device could be used where the photo-resistor current during daylight conditions would heat the bi-metal device to open a normally closed contact pair. In a further alternate embodiment, a piezoelectric actuated relay could be used in place of the triac device, the piezoelectric member deflecting when a DC voltage is applied to open normally closed switch contacts. Similar to the MOSFET design, the piezoelectric configuration would require a rectifier arrangement.

Figure 6:
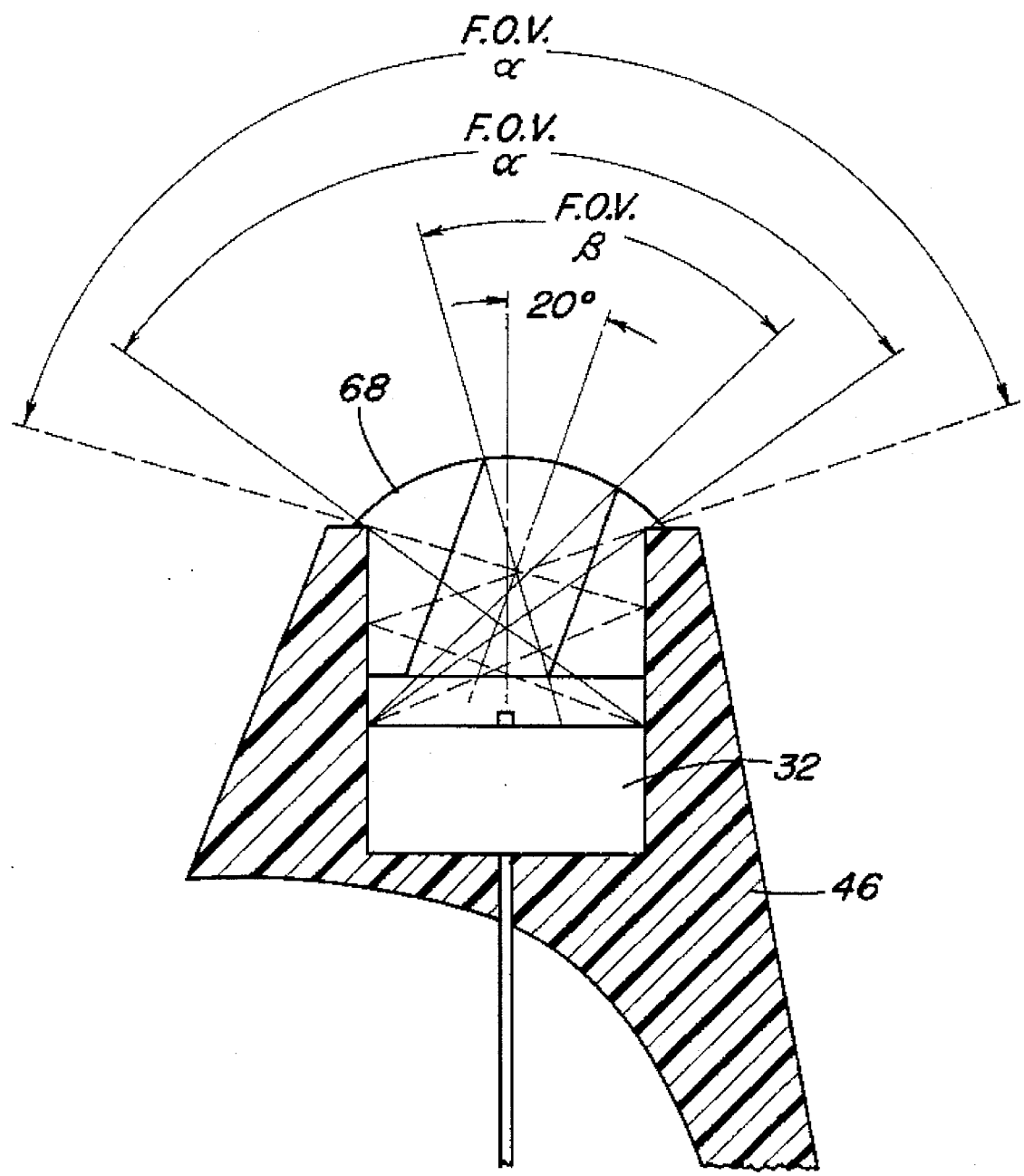
FIG. 6 is an elevational view in section of a photosensor and the manner of mounting such photosensor on a lamp constructed in accordance with the present invention.

In a further embodiment of the lamp assembly 30 shown in FIG. 2, an improved photo-sensing arrangement is provided whereby the field of view (f.o.v.) is specifically restricted so as to insure that false "light" conditions do not occur. It has been observed that such false light conditions can occur when light from the light source is reflected from nearby surfaces or even off of the bodies of insects that fly in front of the top surface 36 of the lamp assembly 30. When this light is reflected back to the photo-sensor device 32, such light may be interpreted as the occurrence of daylight and hence the turning off of the light source prematurely. As seen in FIG. 6, in order to avoid this condition, a collimator tube 68 is inserted into the opening formed at the top of the sensor housing member 46. The collimator tube 68 has a cavity formed therein which is angled outward so as to reduce the field of view to approximately 20 degrees. Moreover, such field of view for the photosensor device 32 disposed at the bottom of the collimator tube is offset from that which would otherwise be present without the collimator tube 68. Moreover, even if the collimator tube 68 were not angled as shown in FIG. 6, the field of view would be reduced a significant amount by the fact that the photosensor device 32 is recessed down into the collimator tube 68. Additionally, the internal surface of collimator tube 68 can be blackened so as to reduce any unwanted reflections within the collimator tube 68. By either the angled or non-angled arrangement, the ambient light conditions that are sensed through the collimator tube 68 are not those directly overtop of the top surface 36 of the lamp envelope 34, the position where the unwanted reflection of the light output occurs. Instead, the ambient light conditions sensed are those that occur immediately outside of the cone of light formed by the light source 54 and reflector configuration of the lamp assembly 30 shown in FIG. 2.

Although the hereinabove described embodiments of the invention constitute the preferred embodiments, it is to be understood that modifications can be made thereto without departing from the scope of the invention as set forth in the appended claims.

What is claimed is:

1. A lamp assembly having an integral photosensor and photosensor circuit associated therewith, said lamp assembly comprising:

a light source;

a lamp envelope having a top portion through which light is transmitted and a side reflective portion effective so as to reflect light generated from said light source through said top portion of said lamp envelope;

a base member mounted on a lower neck portion of said lamp envelope, said lower neck portion formed adjacent said side reflective portion;

a photo-sensor element receptive of ambient light conditions occurring at said top portion of said lamp envelope and being operable such that upon the occurrence of a change in such ambient light conditions, an output signal is produced;

a switching circuit disposed in said base member, said switching circuit being receptive of said output signal associated with said photo-sensor element, said switching circuit is further effective for controlling said light source to an on and an off condition in response to said output signal of said photo-sensor;

pathway formed along said side reflective portion of said lamp envelope, said pathway allowing coupling of said output signal of said photo-sensor to said switching circuit disposed in said base member; and wherein said photo-sensor element is mounted on said top portion of said lamp envelope.

2. The lamp assembly as set forth in claim 1 wherein said light source is a tungsten halogen incandescent light source.

3. The lamp assembly as set forth in claim 1 wherein said pathway is formed by a pathway channel mounted along the external side surface of said side reflective portion of said lamp envelope, said pathway channel preventing damage to lead wires extending from said photosensor element to said switching circuit.

4. The lamp assembly as set forth in claim 3 further comprising a shroud member disposed along an edge formed on said top surface of said lamp envelope, said photo-sensor member disposed in a recessed manner within said shroud member.

5. The lamp assembly as set forth in claim 4 wherein said lamp assembly has a longitudinal axis associated therewith and said shroud member is disposed at an angle directed away from said longitudinal axis.

6. The lamp assembly as set forth in claim 3 wherein said pathway channel is made of a plastic material and is molded so as to conform to the shape of said side reflective portion of said lamp envelope.

7. The lamp assembly as set forth in claim 1 wherein said lamp assembly has associated therewith, a longitudinal axis and said switching circuit is disposed in said base member in a vertically oriented manner along said longitudinal axis.

8. The lamp assembly as set forth in claim 1 wherein said lamp envelope is configured in the form of a parabolic aluminized reflector (PAR) lamp.

9. A reflector lamp comprising:

a light source;

a lamp envelope in which said light source is disposed, said lamp envelope having an essentially planar top surface through which light is transmitted, a reflecting tapered side portion and a lower neck portion;

a threaded screw base mounted on said lower neck portion of said lamp envelope and being effective so as to allow energy to be coupled to said light source;

a photo-sensor element mounted in close proximity to said planar top surface of said lamp envelope; said photosensor being receptive of ambient light conditions occurring near said planar top surface and providing an output condition indicative of such ambient light conditions;

a switching circuit disposed in said screw base, said switching circuit having a thermal connection to said screw base such that heat generated therein is dissipated by said screw base, said switching circuit further being effective for controlling said light source to an on and an off condition in response to said output condition of said photo-sensor element; and a lead path formed of a molded plastic material and disposed externally along said reflecting tapered side portion of said lamp envelope, said lead path having disposed therein, lead wires which extend from said photo-sensor element to said switching circuit.

10. The lamp assembly as set forth in claim 9 wherein said light source is a tungsten halogen incandescent light source.

11. The lamp assembly as set forth in claim 9 further comprising a shroud member disposed along an edge formed on said top surface of said lamp envelope, said photo-sensor element disposed in a recessed manner within said shroud member, said shroud member thereby preventing damage to said photo-sensor member and effectively reducing a field of vision characteristic associated with said photo-sensor member.

12. The lamp assembly as set forth in claim 11 wherein said lamp assembly has a longitudinal axis associated therewith and said shroud member is disposed at an angle directed away from said longitudinal axis.

13. The lamp assembly as set forth in claim 12 wherein said switching circuit is disposed in said screw base in a vertically oriented manner along said longitudinal axis.

14. The lamp assembly as set forth in claim 9 wherein said lamp envelope is configured in the form of a parabolic aluminized reflector (PAR) lamp.

15. A lamp assembly having an integral photosensor and photosensor circuit associated therewith, said lamp assembly comprising:

a light source;

a lamp envelope having a top portion through which light is transmitted and a side reflective portion effective so as to reflect light generated from said light source through said top portion of said lamp envelope;

a base member mounted on a lower neck portion of said lamp envelope, said lower neck portion formed adjacent said side reflective portion;

a photo-sensor element receptive of ambient light conditions occurring at said top portion of said lamp envelope and being operable such that upon the occurrence of a change in such ambient light conditions, an output signal is produced;

a switching circuit disposed in said base member, said switching circuit being receptive of said output signal associated with said photo-sensor element, said switching circuit is further effective for controlling said light source to an on and an off condition in response to said output signal of said photo-sensor;

a pathway formed integrally along said side reflective portion of said lamp envelope, said pathway allowing coupling of said output condition of said photo-sensor element to said switching circuit disposed in said base member; and wherein said photo-sensor element is mounted internally of said lamp assembly near said lower neck portion of said lamp envelope adjacent said base member and in close proximity to said switching circuit, said photo-sensor element being effective so as to sense said ambient light conditions which are transmitted from said top portion of said lamp envelope, through said pathway formed by a wall section associated with said side reflective portion of said lamp envelope and to said photo-sensor element.

\* \* \* \* \*